(12) United States Patent
White, III

(10) Patent No.: US 12,486,777 B2
(45) Date of Patent: *Dec. 2, 2025

(54) VANE WITH SEAL

(71) Applicant: RTX CORPORATION, Farmington, CT (US)

(72) Inventor: Robert White, III, Meriden, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,049

(22) Filed: Feb. 6, 2024

(65) Prior Publication Data

US 2025/0020065 A1   Jan. 16, 2025

Related U.S. Application Data

(60) Division of application No. 17/577,209, filed on Jan. 17, 2022, now Pat. No. 11,933,196, which is a (Continued)

(51) Int. Cl.
*F01D 9/04* (2006.01)
*F01D 5/18* (2006.01)
(Continued)

(52) U.S. Cl.
CPC .............. *F01D 9/041* (2013.01); *F01D 5/18* (2013.01); *F05D 2240/12* (2013.01); *F05D 2240/55* (2013.01)

(58) Field of Classification Search
CPC . F01D 9/041; F01D 9/042; F01D 5/02; F01D 5/025; F01D 5/14; F01D 5/18;
(Continued)

(56) References Cited

U.S. PATENT DOCUMENTS 4,314,483 A    2/1982  Wyler
5,074,752 A   12/1991  Murphy et al.
(Continued)

FOREIGN PATENT DOCUMENTS

DE        102017208678      11/2018

OTHER PUBLICATIONS

Extended European Search Report for European Patent Application No. 20205687.5 dated Mar. 2, 2021.

*Primary Examiner* — Eric J Zamora Alvarez
(74) *Attorney, Agent, or Firm* — Carlson, Gaskey & Olds, P.C.

(57) ABSTRACT

An airfoil vane assembly includes a vane piece defining a first vane platform, a second vane platform, and a hollow airfoil section joining the first vane platform and the second vane platform. The first vane platform defines a collar projection therefrom. A spar piece defines a spar platform and a spar extends from the spar platform into the hollow airfoil section. The spar platform includes a radial opening defined by first and second axial faces. The radial opening is configured to receive the collar projection, and a groove in the first axial face. A seal is situated in the groove. The seal seals against the collar projection and a biasing member is configured to bias the seal towards the collar projection. A method of assembling a vane is also disclosed.

4 Claims, 3 Drawing Sheets

Related U.S. Application Data continuation of application No. 16/678,549, filed on Nov. 8, 2019, now Pat. No. 11,261,748.

(51) Int. Cl.
*F01D 5/28* (2006.01)
*F01D 11/00* (2006.01)

(58) Field of Classification Search
CPC ........ F01D 5/282; F01D 11/02; F01D 11/003; F01D 11/005; F01D 11/006; F01D 11/08; F01D 5/284; F01D 25/005; F01D 25/12; F01D 5/147; F01D 5/246; F01D 9/044; F01D 5/188; F01D 5/189; F01D 5/3084; F05D 2300/20; F05D 2300/10; F05D 2300/6033; F05D 2300/603; F05D 2230/51; F05D 2240/80; F05D 2240/81; F05D 2240/11; F05D 2240/12; F05D 2240/55; F05D 2260/38; F05D 2260/30; F05D 2260/607; Y02T 50/60

See application file for complete search history.

(56) References Cited

U.S. PATENT DOCUMENTS

| | | |
|---|---|---|
| 5,630,700 A | 5/1997 | Olsen et al. |
| 6,464,456 B2 | 10/2002 | Darolia et al. |
| 2007/0231150 A1 | 10/2007 | Dervaux et al. |
| 2010/0068034 A1 | 3/2010 | Schiavo et al. |
| 2016/0153299 A1 | 6/2016 | Tuertscher et al. |
| 2016/0376899 A1 | 12/2016 | Prugarewicz et al. |
| 2017/0022821 A1 | 1/2017 | Ferber et al. |
| 2017/0175534 A1 | 6/2017 | Ferber et al. |
| 2019/0153883 A1 | 5/2019 | Kim |
| 2020/0072066 A1* | 3/2020 | Thomas ............... F01D 25/005 |
| 2020/0248569 A1 | 8/2020 | Whittle et al. |
| 2021/0062663 A1* | 3/2021 | Whittle ................. F01D 5/282 |

* cited by examiner

VANE WITH SEAL

CROSS-REFERENCE TO RELATED APPLICATIONS

This application is a divisional of U.S. patent application Ser. No. 17/577,209 filed Jan. 17, 2022; which is a continuation of U.S. patent application Ser. No. 16/678,549 filed Nov. 8, 2019 now U.S. Pat. No. 11,261,748 granted Mar. 1, 2022; the disclosure of which is incorporated by reference in its entirety herein.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other attractive properties, CMCs have high temperature resistance and oxidation resistance. Despite these attributes, however, there are unique challenges to implementing CMCs in airfoils.

SUMMARY

An airfoil vane assembly according to an example of this disclosure includes a vane piece defining a first vane platform, a second vane platform, and a hollow airfoil section joining the first vane platform and the second vane platform. The first vane platform defines a collar projection therefrom. A spar piece defines a spar platform and a spar extends from the spar platform into the hollow airfoil section. The spar platform includes a radial opening defined by first and second axial faces. The radial opening is configured to receive the collar projection, and has a groove in the first axial face. A seal is situated in the groove. The seal seals against the collar projection. A biasing member is configured to bias the seal towards the collar projection.

In a further example of the foregoing, the first axial face is an outer axial face with respect to a centerline of the airfoil section.

In a further example of any of the foregoing, the seal is formable to a contour of the collar projection, and is non-abrasive with respect to the collar projection.

In a further example of any of the foregoing, the seal includes multiple fingers, each of the multiple fingers are configured to contact the collar projection at a contact point.

In a further example of any of the foregoing, the multiple fingers are formed by a corrugated sheet.

In a further example of any of the foregoing, multiple filler structures are configured to support the multiple fingers of the corrugated sheet.

In a further example of any of the foregoing, multiple fingers each have a rounded distal end.

In a further example of any of the foregoing, the spar piece is metallic and the vane piece is ceramic.

A gas turbine engine according to an example of this disclosure includes a compressor section. A combustor is in fluid communication with the compressor section. A turbine section is in fluid communication with the combustor. The turbine section has a vane including a vane piece defining a first vane platform, a second vane platform, and a hollow airfoil section joining the first vane platform and the second vane platform. The first vane platform defines a collar projection therefrom. A spar piece defines a spar platform and a spar extends from the spar platform into the hollow airfoil section. The spar platform includes a radial opening defined by first and second axial faces. The radial opening is configured to receive the collar projection. A groove is in the first axial face. A seal is situated in the groove. The seal seals against the collar projection and a biasing member is configured to bias the seal towards the collar projection.

In a further example of the foregoing, the first axial face is an outer axial face with respect to a centerline of the airfoil section.

In a further example of any of the foregoing, the seal is formable to a contour of the collar projection, and is non-abrasive with respect to the collar projection.

In a further example of any of the foregoing, the seal is non-abrasive with respect to the collar projection.

In a further example of any of the foregoing, the seal includes multiple fingers, each of the multiple fingers are configured to contact the collar projection at a contact point.

In a further example of any of the foregoing, the multiple fingers are formed by a corrugated sheet.

In a further example of any of the foregoing, the multiple fingers each have a rounded distal end.

In a further example of any of the foregoing, the spar piece is metallic and the vane piece is ceramic.

A method of assembling a vane according to an example of this disclosure includes inserting a spar piece into a central cavity of a hollow airfoil section of a vane piece. The vane piece has a first vane platform, a second vane platform, and the hollow airfoil section joining the first vane platform and the second vane platform. The first vane platform defines a collar projection therefrom, and a collar projection extends radially outward from the outer platform. The insert has a platform section that corresponds to the outer platform of the airfoil and that includes a radial opening configured to receive the collar. The spar piece includes a spar platform and a spar extends from the spar platform with a radial opening defined by first and second axial faces. The radial opening is configured to receive the collar projection, and a groove is in the first axial face and provides a seal situated in the groove. The seal seals against the collar projection, and is biased towards the collar projection by a biasing member.

In a further example of the foregoing, the seal includes a plurality of fingers, each of the plurality of fingers configured to contact the collar projection at a contact point.

In a further example of any of the foregoing, the biasing member is compressed with a sacrificial clip during the insertion.

In a further example of any of the foregoing, the spar piece is metallic and the vane piece is ceramic.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
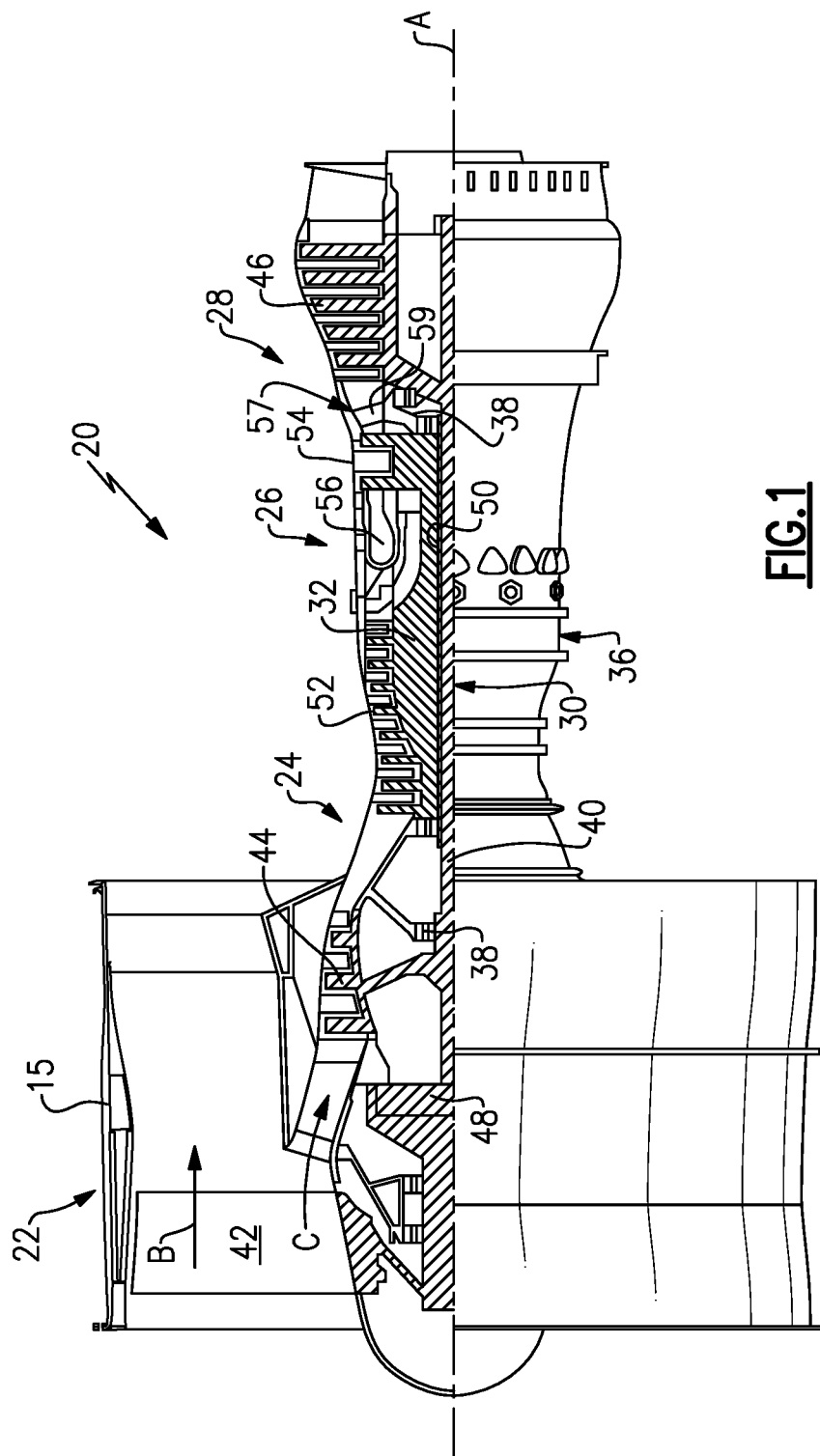
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)]^0.5. The "Low corrected fan tip speed" as disclosed herein according to one non-limiting embodiment is less than about 1150 ft/second (350.5 meters/second).

Figure 2:
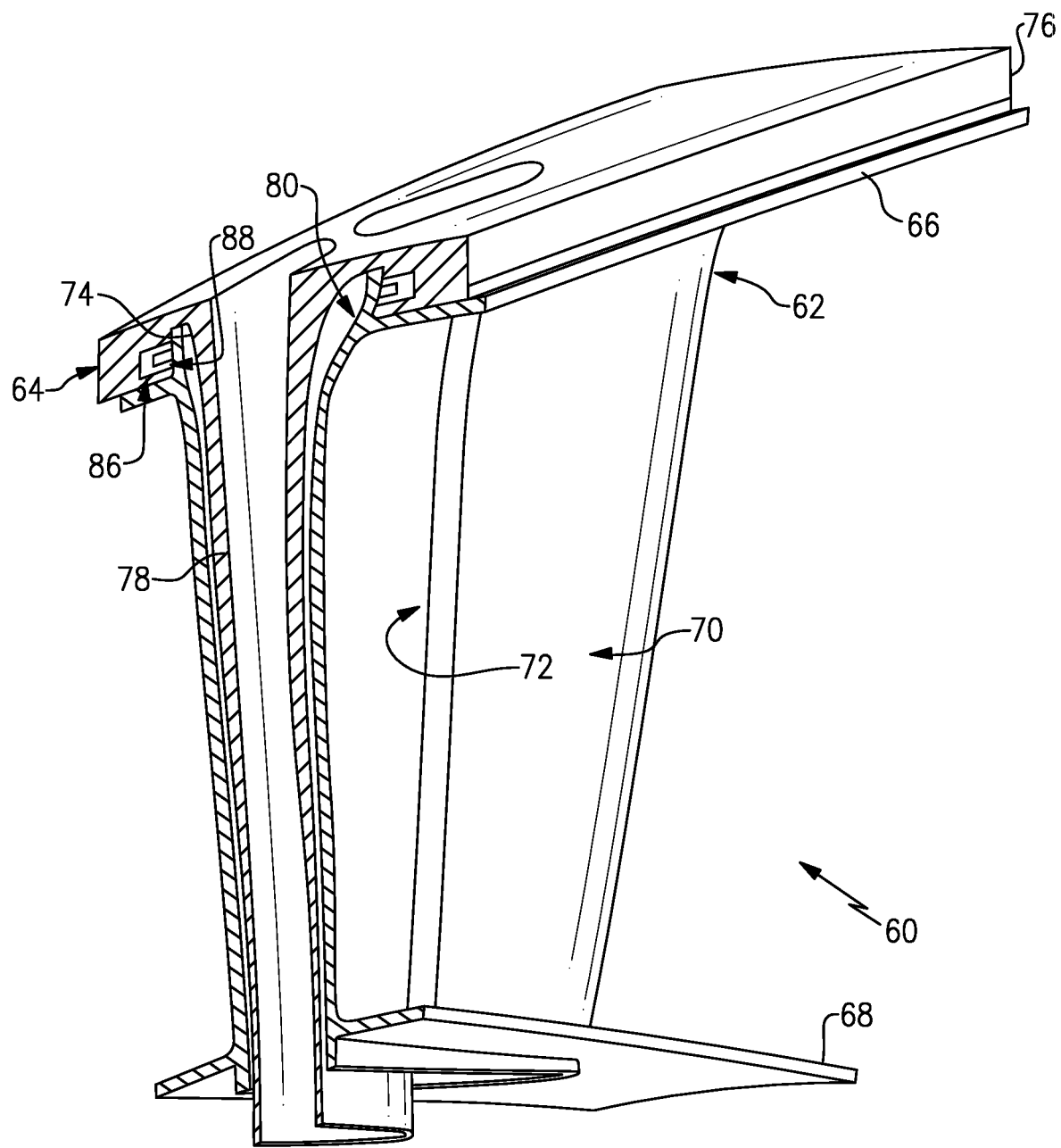
FIG. 2 schematically shows an airfoil vane assembly for the gas turbine engine of FIG. 1.

FIG. 2 illustrates a sectioned view of a representative vane 60 from the turbine section 28 of the engine 20, although the examples herein may also be applied to vanes in the compressor section 24. A plurality of vanes 60 are situated in a circumferential row about the engine central axis A. The vane 60 is comprised of a vane piece 62 and a spar piece 64. The vane piece 62 includes several sections, including first (radially outer) and second (radially inner) platforms 66/68 and a hollow airfoil section 70 that joins the first and second platforms 66/68. The airfoil section 70 includes at least one internal passage 72. The airfoil section 70 extends beyond the first platform 66 to form a collar 74 that projects radially from the first platform 66. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vane piece 62 may be formed of a metallic material, such as a nickel- or cobalt-based superalloy, but more typically will be formed of a ceramic. The ceramic may be a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the vane piece 62. For instance, the fiber plies may be layers or tapes that are laid-up one on top of the other to form the stacked configuration. The fiber plies may be woven or unidirectional, for example. In one example, at least a portion of the fiber plies may be continuous through the first platform 66, the airfoil section 70, and the second platform 68. In this regard, the vane piece 62 may be continuous in that the fiber plies are uninterrupted through the first platform 66, the airfoil section 70, and the second platform 68. In alternate examples, the vane piece 62 may be discontinuous such that the first platform 66, the airfoil section 70, and/or the second platform 68 are individual sub-pieces that are attached to the other sections of the vane piece 62 in a joint.

The spar piece 64 defines a spar platform 76 and a (hollow) spar 78 that extends from the spar platform 76 into the hollow airfoil section 70. For example, the spar piece 64 is formed of a metallic material, such as a nickel- or cobalt-based superalloy, and is a single, monolithic piece.

Figure 3:
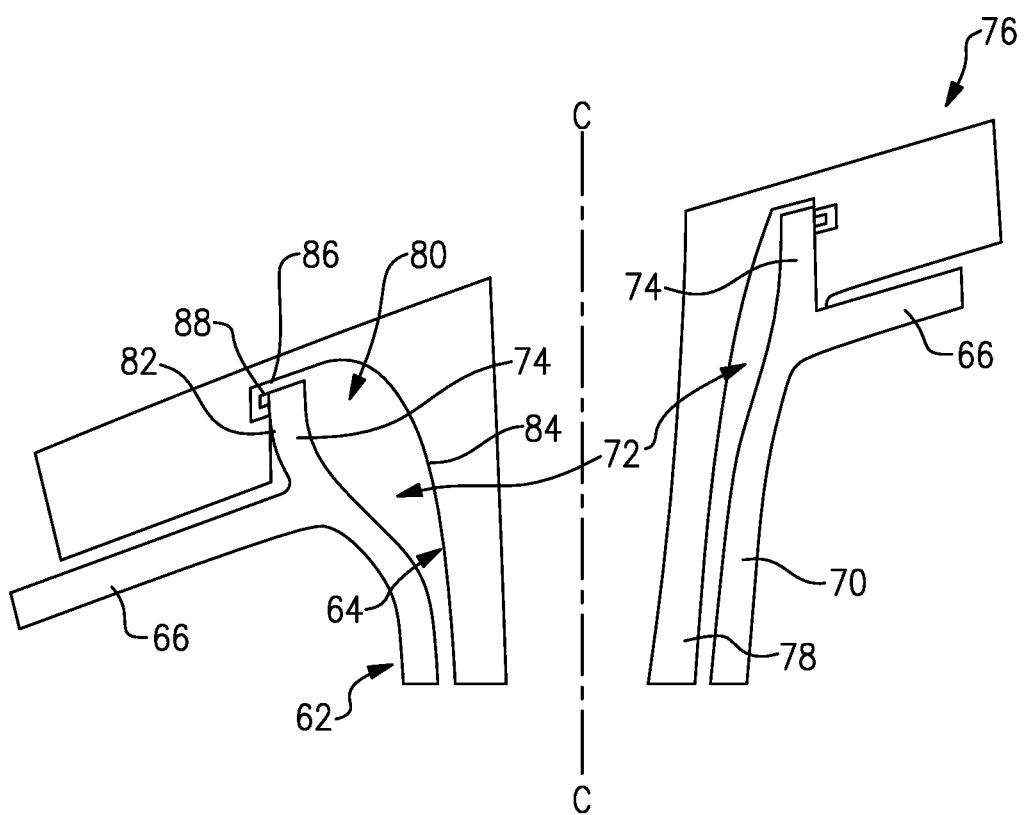
FIG. 3 schematically shows a detail view of a radially outer end of the airfoil vane of FIG. 2.

Referring also to FIG. 3, which shows a detail sectioned view of portions of the vane 60, the spar platform 76 includes a radial opening 80 defined by two axial faces 82/84 which receives the collar 74. A groove 86 is formed in the spar platform 76 which opens at the outer (with respect to a centerline C of the airfoil section 70) axial face 82. A seal 88 is situated in the groove 86.

The seal 88 seals against the collar 74 of the first vane platform 66. During operation of the engine 20, cooling air, such as bleed air from the compressor section 24, may be provided through the spar piece 64 into the internal passage 72 of the airfoil section 70. The seal 88 serves to facilitate a reduction in air leakage from the internal passage 72 through the interface between the spar platform 76 and the first platform 66 of the vane piece 62.

Figure 4:
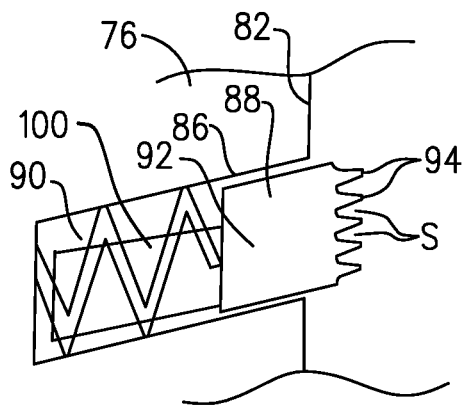
FIG. 4 schematically shows a detail view of a seal for the airfoil vane of FIGS. 2-3.

FIG. 4 shows a detail view of the groove 86 and the seal 88. As shown in FIG. 4, a biasing member 90, such as a spring, biases the seal 88 towards the collar 74.

The seal 88 includes a seal body 92 with multiple fingers 94 extending from the seal body 92. The fingers 94 are each configured to contact the collar 74 at individual points of contact. The seal 88 exerts a force on the collar 74 due to the biasing member 90. The multiple fingers 94 spread this force amongst the multiple points of contact. The multiple fingers 94 therefore reduce the force exerted on any given point of the collar 74. Additionally, spreading the force amongst the multiple fingers 94 in this way reduces the effect of possible imbalances in the force exerted by biasing member 90 on the seal 88, and improves the sealing connection with the collar 74.

The multiple fingers 94 may be machined (e.g., broached, diamond creep-feed ground, etc.) or formed into the CMC material of the seal body 92 (e.g., at the preform stage by a mold, as would be known in the art).

The seal 88, including the multiple fingers 94, is compliant. The multiple fingers 94 therefore enable the seal 88 to form to the contour of the collar 74, providing an improved sealing connection therebetween.

Figure 5:
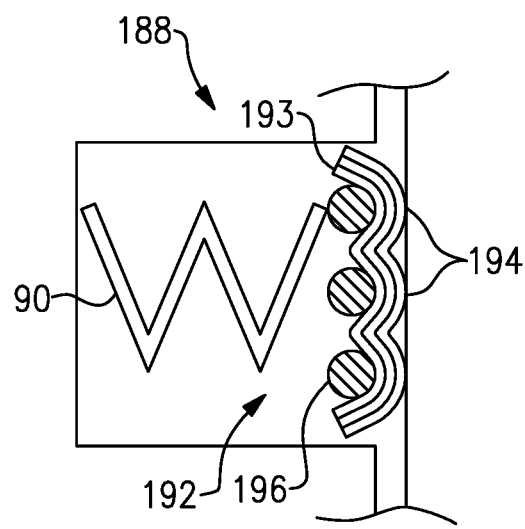
FIG. 5 schematically shows a detail view of another example seal for the airfoil vane of FIGS. 2-3.

In one example, the seal 88 includes a corrugated sheet, and the corrugations provide the multiple fingers 94. FIG. 5 shows an alternate example seal 188 with a corrugated sheet 193 that provides multiple fingers 194. In this example, the seal body 192 comprises multiple filler structures 196 that support the multiple fingers 194. For example, the filler structures 196 can be monolithic ceramic structures or extruded metal wires. The filler structure 196 provide structural support for the corrugations/bends of the corrugated sheet 193 that provide the multiple fingers 194.

The multiple fingers 94 also act as a labyrinth (e.g., as in a labyrinth seal) by providing spaces S therebetween. The space S provide a tortuous path for airflow in the seal 88, thereby reducing the ability of the air to escape the seal 88, and improving the sealing connection at the collar 74. The seal 88 can be formed from a compliant high-temperature material. Complaint high-temperature materials include metallic materials or ceramic-based fabrics, like graphite fabrics. An example ceramic-based fabric is a graphite fabric. The graphite fabric may comprise multiple plies, as would be known in the art. The graphite fabric may have 3-5 plies, in one particular example. In other examples, the seal 88 can be made of a compliant polymeric material.

The material of the collar 74 and the seal 88 may expand at different rates in response to temperature changes during operation of the engine 20. This thermal mismatch may cause misalignment of the seal 88 with respect to the collar 74. However, the multiple fingers 94 and multiple points of contact ensure a sealing connection with the collar 74 at least at some of the contact points, reducing the possibility of sealing loss due to misalignment.

The collar 74 may also shift with respect to the seal 88 during operation of the engine. The seal 88 is non-abrasive with respect to the collar 74. To that end, in some examples, the multiple fingers 94 have rounded, e.g., non-sharp, distal ends which contact the collar 74 to provide sealing without abrading the collar 74. For instance, in the example where the multiple fingers 94 are provided by a corrugated sheet, the corrugations have rounded, non-sharp ends.

The seal 88 may include a continuous body that circumscribes the collar projection 74 (e.g., a closed loop). In another example, the seal 88 comprises multiple segments arranged circumferentially around the collar projection 74 (e.g., an open loop).

The vanes 60 are assembled by inserting the seal 88 into the groove 86, and then inserting the spar piece 64 into the vane piece 62. In one example, the biasing member 90 is compressed prior to the insertion of the seal 88 into the groove 86 by a sacrificial clip. The sacrificial clip is comprised of a low temperature plastic that would burn off during operation of the engine 20, freeing the biasing member 90. In another example, an adhesive or wax is applied to the seal 88 to hold it in a position where the biasing member 90 is compressed prior to the insertion of the seal 88 into the groove 86. As in the previous example, the adhesive or wax would burn off during operation of the engine 20. In some examples, a lubricant is applied to the seal 88 and in particular to distal ends of the fingers 94 to maintain alignment of the seal 88 within the groove 86 during insertion of the spar piece 64 into the vane piece 62.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of assembling a vane, comprising:
inserting a spar piece into a central cavity of a hollow airfoil section of a vane piece, the vane piece having a platform and a hollow airfoil section including a first extension extending from a first side of the platform and a second extension extending from a second side of the platform, and the spar piece having a platform section that corresponds to the platform of the vane piece and that includes a radial opening defined by first and second axial faces and configured to receive the first extension of the hollow airfoil section, and a groove in the first axial face configured to receive a seal.

2. The method of claim 1, further comprising providing a seal situated in the groove, the seal sealing against the first extension.

3. The method of claim 2, further comprising biasing the seal towards the first extension.

4. The method of claim 1, wherein the seal includes a plurality of fingers, each of the plurality of fingers configured to contact the first extension at a contact point.

\* \* \* \* \*